United States Patent
Smith

(10) Patent No.: US 6,435,725 B1
(45) Date of Patent: Aug. 20, 2002

(54) SHEAVE ASSEMBLIES AND PULLEY BLOCKS

(75) Inventor: Giles Smith, Burnham-on-Crouch (GB)

(73) Assignee: Allen Brothers (Fittings) Limited, Southminster (GB)

(*) Notice: Subject to any disclaimer, the term of this patent is extended or adjusted under 35 U.S.C. 154(b) by 0 days.

(21) Appl. No.: 09/763,328
(22) PCT Filed: Aug. 20, 1999
(86) PCT No.: PCT/GB99/02619
§ 371 (c)(1),
(2), (4) Date: Feb. 20, 2001
(87) PCT Pub. No.: WO00/11375
PCT Pub. Date: Mar. 2, 2000

(30) Foreign Application Priority Data

Aug. 20, 1998 (GB) .............................. 98 18157

(51) Int. Cl.$^7$ ........................... F16C 33/32; F16C 33/62
(52) U.S. Cl. ........................ 384/492; 384/547; 384/515; 384/516
(58) Field of Search ................................ 384/547, 513, 384/515, 516, 492

(56) References Cited

U.S. PATENT DOCUMENTS

| | | | |
|---|---|---|---|
| 472,769 A | * 4/1892 | Parkin | 384/547 |
| 1,141,512 A | * 6/1915 | Adam et al. | 384/547 |
| 2,884,286 A | * 4/1959 | Pieper | 16/98 |
| 3,528,645 A | * 9/1970 | Harken | 254/412 |
| 4,390,163 A | * 6/1983 | Merry | 254/412 |
| 4,602,875 A | * 7/1986 | Doerr et al. | 384/477 |
| 5,845,998 A | * 12/1998 | Larson et al. | 384/492 |

FOREIGN PATENT DOCUMENTS

DE 4123808 * 2/1992 ................. 384/547

* cited by examiner

Primary Examiner—Jack Lavinder
Assistant Examiner—Devon Kramer
(74) Attorney, Agent, or Firm—Renner, Kenner, Greive, Bobak, Taylor & Weber

(57) ABSTRACT

A sheave assembly for use in a high performance pulley block has an inner race 14, a sheave 10 defining an outer race and a plurality of balls 13 arranged between the outer race of the sheave 10 and the inner race 14, so as rotatably to mount the sheave on the inner race. The inner race 14 is formed principally of a plastics material, but incorporates an annular insert 20 of metal, the outer surface of the insert extending parallel to the axis of the assembly, and defining an inner track for the balls 13. The axial width of the insert 20 is significantly less than, and typically 33% to 67% of, the diameter of the balls 13.

15 Claims, 3 Drawing Sheets

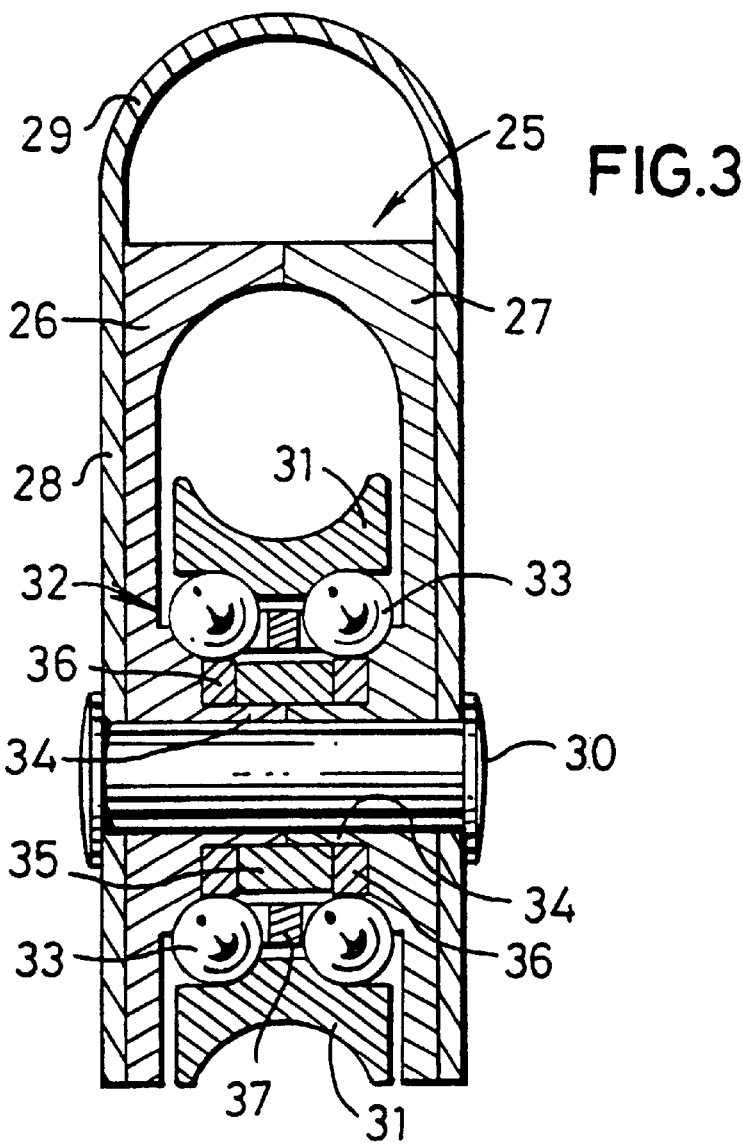
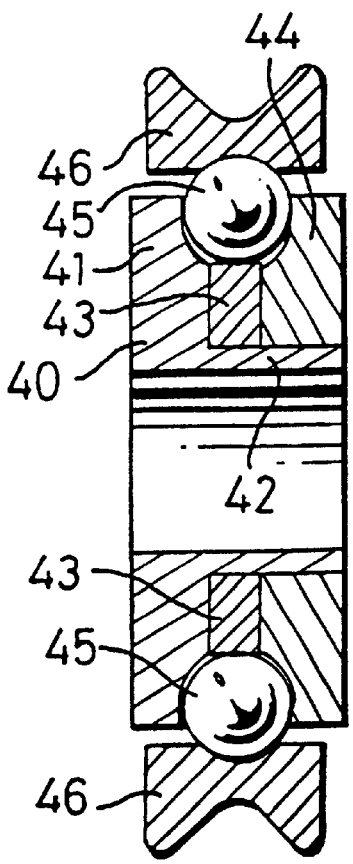
FIG.3
FIG.5

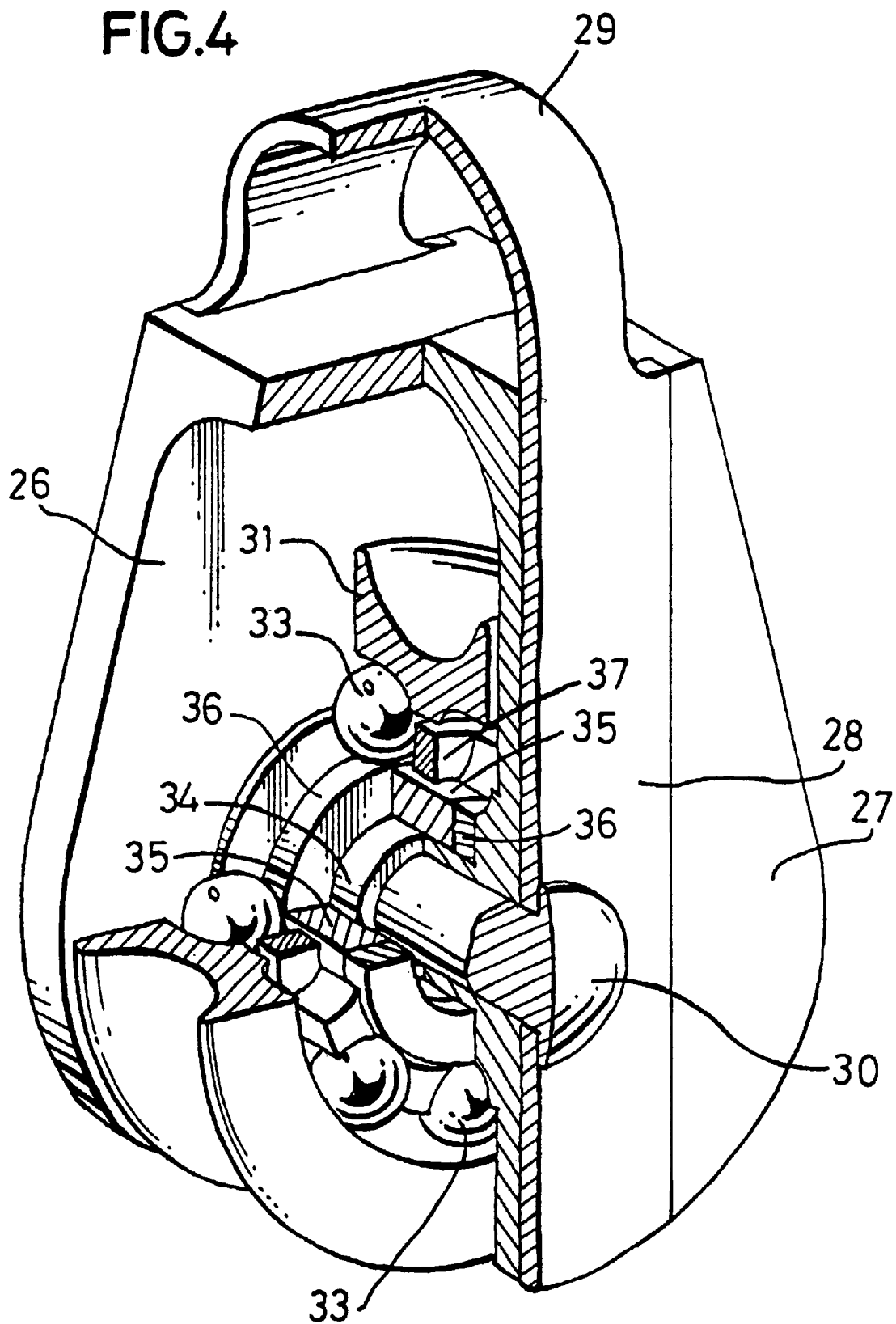

SHEAVE ASSEMBLIES AND PULLEY BLOCKS

This invention relates to a sheave assembly incorporating a ball bearing supporting a rotatable sheave. Further, this invention relates to a pulley block incorporating such a sheave assembly.

Though a pulley block incorporating a sheave assembly of this invention may be used in a wide variety of circumstances, where a rope or other flexible tension member is to be guided through some angle by the pulley or as a part of a tackle, the invention is primarily intended for a pulley block to be used on, high performance sail-boats and racing dinghies in particular, where excellent reliability is demanded, in conjunction with high strength but low weight. Consequently, the invention will hereinafter be described primarily with reference to such intended use, even though it is to be understood that the invention is not to be regarded as limited to that use.

A typical pulley block (often referred to just as a 'block') employs a sheave (pulley) rotatably mounted on a block pin by means of a ball bearing. The pin is carried within a shell having a pair of side cheeks, a strap (or strop) extending around the shell to permit mounting of the block. The ball bearing typically has two axially-spaced rows of balls which run on inner and outer races provided respectively on the pin and within the bore of the sheave. When both the pin and sheave are of metal, the respective races may be formed directly on the surface of the pin and within the bore of the sheave, rather than by providing a separate ball bearing assembly including inner and outer races together with caged balls.

A modern high performance pulley block intended for use for example on a racing dinghy is manufactured mainly from plastics materials, rather than metals. Thus, the block cheeks, as well as at least some of the sheave, inner race and balls may be made of plastics materials by suitable moulding operations, with the sheave itself providing the outer race. Unfortunately, there is a tendency particularly with dinghy sailors to employ smaller (and so lighter) blocks and to subject those blocks to higher loads. This has led to premature failure of the blocks, the particular component which fails depending upon the precise construction employed. For example, if the inner race and sheave are made of plastics materials and stainless steel balls are employed, the inner race may fail consequent upon by the loads imparted thereto by the balls. Thus, it has proved necessary either to employ a block of a significantly greater size, or a block with metal races and balls, if premature failure is to be avoided but both of these solutions have the disadvantages of increasing the weight of the block as well as introducing higher costs.

In an attempt to address the above problems, the present invention provides a sheave assembly comprising an inner race, a sheave defining an outer race and a plurality of balls arranged between the outer race of the sheave and the inner race thereby rotatably mounting the sheave co-axially on the inner race, wherein the inner race is formed principally of a plastics material but incorporates an annular insert of a relatively hard material, the outer surface of the insert extending substantially parallel to the axis of the inner race and defining an inner track around which the balls run, and the axial width of the insert being significantly less than the diameter of each ball.

It will be appreciated that by employing a sheave assembly of the present invention in a pulley block, the weight of the pulley block will be increased only relatively slightly, as compared to a block having an inner race wholly of a plastics material. However, the relatively high point-contact loads between the balls and an inner race of a plastics material are avoided, so much greater strength, efficiency and durability and consequently also reliability may be expected from a block incorporating a sheave assembly of this invention, as compared to a block having an inner race solely of a plastics material. In addition, the quantity of metal employed in the block is small and so the cost associated with the use of relatively expensive corrosion-resistant metals is minimised.

Most preferably, the annular insert is manufactured from a metal, such as a marine grade of stainless steel, though it could be formed from other metals such as brass, a bronze or an aluminium alloy. Each ball may be of any suitable material having regard to the intended use of the block; for example, the balls may be of stainless steel, tungsten, ceramics or plastics materials.

In a sheave assembly of this invention, each insert has an essentially cylindrical outer surface parallel to the axis of the inner race. Thus, there is essentially a point contact between each ball and the annular insert. Consequently, the insert may have a relatively narrow width, in the axial direction, so long as there is sufficient width on which the balls may run, taking into account manufacturing tolerances, running clearances and an allowance for expected wear, during the life of the block. On the other hand, a narrower insert reduces yet further the overall weight of a complete block. Typically, therefore, the insert will have an axial width not greater than about $\frac{2}{3}$ of the diameter of each ball running on the insert, though the width may be reduced yet further, perhaps to no more than 50% of the ball diameter.

Though the sheave assembly of this invention could have a single row of balls supporting the sheave on a single insert, it is highly preferred that a sheave assembly or a block using the sheave assembly has two rows of balls, the sheave defining an outer race having two tracks respectively for the two rows of balls. In this case, the inner race should have two annular inserts spaced axially therealong and defining two inner tracks, respectively for the two rows of balls. Such an inner race may conveniently have three plastics parts each manufactured by a moulding operation, these parts comprising a central section and a pair of end flanges mounted one onto each end of the central section, with the two annular inserts being carried between the central section and each end flange, respectively. In a preferred arrangement, the central section has an axially-projecting boss formed at each end, an insert and an end flange being mounted on each boss, respectively. Each end flange may define a side thrust surface for the balls, whereby attachment of the end flange to the associated boss, on assembling the block, will retain the sheave on the inner race. Conveniently, each end flange is simply an interference friction fit on its boss, though the flange could be secured to the boss by means of an adhesive which chemically bonds together the two components.

Another possibility is to utilise the side cheeks of a block within which the assembly is installed to maintain the inserts in position on the central section, with the side cheeks being profiled to take any side thrusts. In an alternative arrangement, the inner race may be a one-piece plastics material moulding, with the or each annular insert incorporated therein during the moulding operation.

The sheave advantageously is a one-piece plastics material moulding. In view of the greater diameter of the bore of the sheave, as compared to the diameter of the inner race, the outer race for the balls may be formed directly in the sheave, without the need to employ a separate race within the sheave and defining the ball tracks. In the alternative, the sheave could be of other materials, such as an aluminium alloy.

To reduce weight and the cost of the balls, it may be preferred for a cage to be provided for the balls of the bearing, to hold each ball spaced from its neighbouring balls. However, for small-sized blocks (<20 mm diameter sheaves), it is preferred to employ uncaged balls, even though this requires the use of more balls.

The sheave assembly of this invention may be incorporated in a simple pulley block comprising a shell defined by a pair of side cheeks, together with a pin extending therebetween and on which is carried the inner race, between the side cheeks. In the alternative, the inner race itself could form the block pin, and so be directly mounted in the side cheeks of the shell.

If required, a plurality of the sheave assemblies may be mounted between the side cheeks of a block, either on a common pin so as to be co-axial, or on individual pins spaced from each other. In the latter case, the sheaves of the assemblies should be of different diameters, to permit free running of ropes around the sheaves when the block is employed in a tackle.

This invention extends to a pulley block incorporating one or more sheave assemblies of this invention, as described above. In such a pulley block, there may be a hole extending axially through the inner race, in combination with a pulley shell defining a pair of side cheeks and a block pin carried by the side cheeks which block pin extends through the hole of the inner race so as to support the sheave assembly between the side cheeks. As mentioned above, the side cheeks may be profiled to accept side thrust from the balls mounting the sheave on the inner race.

By way of example only, specific embodiments of a sheave assembly and of a pulley block both constructed and arranged in accordance with the present invention will now be described with reference to the accompanying drawings, which:

FIG. 3 is a cross section through the pulley block incorporating a sheave assembly of this invention;

FIG. 4 is a partially cut-away isometric view of the pulley block shown in FIG. 3, and FIG. 5 is a cross-section through a further sheave assembly of this invention.

Figure 1:
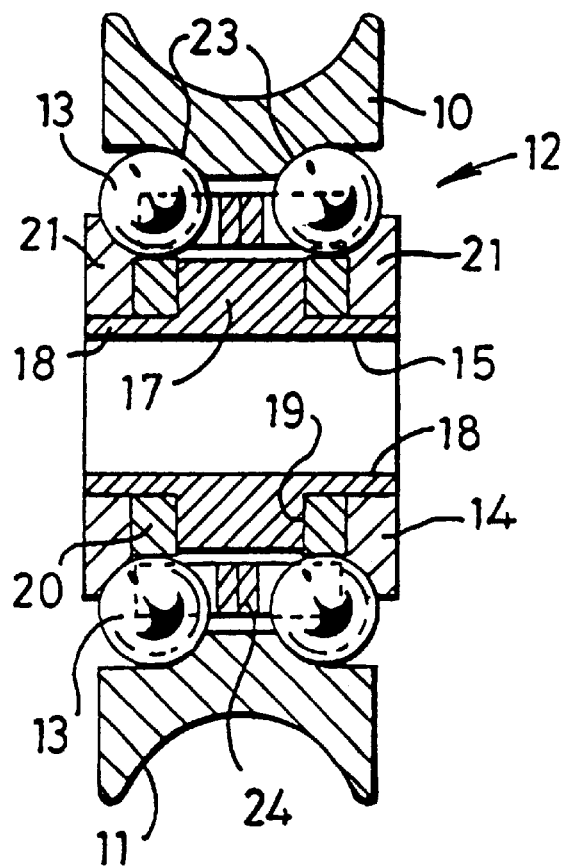
FIG. 1 is a cross-section through the sheave assembly, for mounting within a shell to form a complete block.

The sheave assembly shown in the drawings comprises a sheave 10 having a score 11 for receiving a rope or wire, a ball bearing assembly 12 including two rows of balls 13 rotatably mounting the sheave on an inner race 14. The inner race has a through-bore 15 by means of which that inner race may be mounted on a block pin (not shown), the pin being carried within the shell of a block made up from two side cheeks and a strop extending partially therearound, to permit the attachment of the block to a component. The pin, shell and strop may all be entirely conventional and form no part of the present invention; these parts are well understood by those skilled in the art and will not therefore be described in further detail here.

The inner race 14 comprises a central part 17 provided with a respective boss 18 at each end, whereby a shoulder 19 is defined between the end of the central part and each boss. Abutting each shoulder is an annular metal insert 20, which insert is held in place by an end flange 21 press-fitted onto the associated boss 18.

Each insert 20 is of simple annular shape, with an outer periphery essentially parallel to the axis of the inner race 14. Each insert defines a metal track for the respective row of balls 13, whereby the load imparted to the inner race by the balls is carried by the insert 20. The end flanges 21 are profiled in order to be able to take side thrust from the balls 13, so that when the flanges have been secured to the bosses of the central part, the sheave is retained on the inner race 14.

The sheave itself is profiled to define two outer tracks 23 for the balls 13, without the need to provide a separate outer race let into a bore in the sheave 10. As shown, the balls are held separate from each other by means of a cage 24.

The central part 17 and end flanges 21 of the inner race 14 are manufactured from plastics material, by a suitable moulding process. The sheave 10 also is of a plastics material, as is the cage 24. The inserts 20 are of stainless steel, and typically each takes the form of a high-precision stainless steel washer. The balls 13 typically are of stainless steel, though these also could be made of a plastics or other suitable material.

As each ball makes only a point contact with an insert 20, the insert may be relatively narrow, though it must be sufficiently wide to accommodate manufacturing tolerances and running clearances, as well as a certain amount of wear of both the end flanges 21 and the sheave 10. Typically, with an assembly having an outer sheave diameter of 27 mm and balls of 4 mm diameter, each insert may have an axial width of about 1.5 mm. In the case of an outer sheave diameter of 20 mm and balls of 2.5 mm diameter, each insert may have an actual width of 1.0 mm. However, the described construction is applicable to any size of block and either caged or uncaged balls could be employed. Moreover, though for minimum weight the sheave should be of a plastics material, it could be manufactured from other materials, such as metals. Also, though in the preferred constructions the balls and inserts are of stainless steel, other metals could be employed or indeed other hard materials such as a ceramic.

A pulley block incorporating a sheave assembly as described above will demonstrate high reliability as well as high strength, with only a very small weight increase as compared to a sheave assembly of a comparable size but with an inner race formed wholly of a plastics material.

FIGS. 3 and 4 show a complete pulley block also embodying the present invention. The block has a shell 25 made from two moulded plastics material side cheeks 26 and 27, with a stainless steel strap 28 extending over the outer surfaces of the side cheeks 26 and 27 and defining a loop 29 by means of which the pulley block may be attached to some other component, such as a shackle. A block pin 30 extends through registering holes in the strap and side cheeks, the ends of the pin 30 being riveted or peened in order to retain the pin position and hold the shell 25 together.

A sheave 31 is rotatably mounted about the block pin 30 by means of a ball bearing 32 including two rows of balls 33, the sheave itself defining an inner race having two tracks, respectively for the two rows of balls. Thus, the sheave 31 may correspond to sheave 10 of the assembly described above.

The inner race for the balls 33 is defined by the portions 34 of the side cheeks 26 and 27 surrounding the block pin 30, together with a cylindrical spacer 35 and a pair of metal inserts 36, each corresponding to insert 20 of the sheave assembly described above. Portions 34 of the side cheeks 26 and 27 are suitably profiled in order to accept side thrust from the balls 33, whereby the sheave 31 is constrained to run centrally within the shell 25. As with the sheave assembly, the balls are held spaced apart by means of a cage 37.

Figure 2:
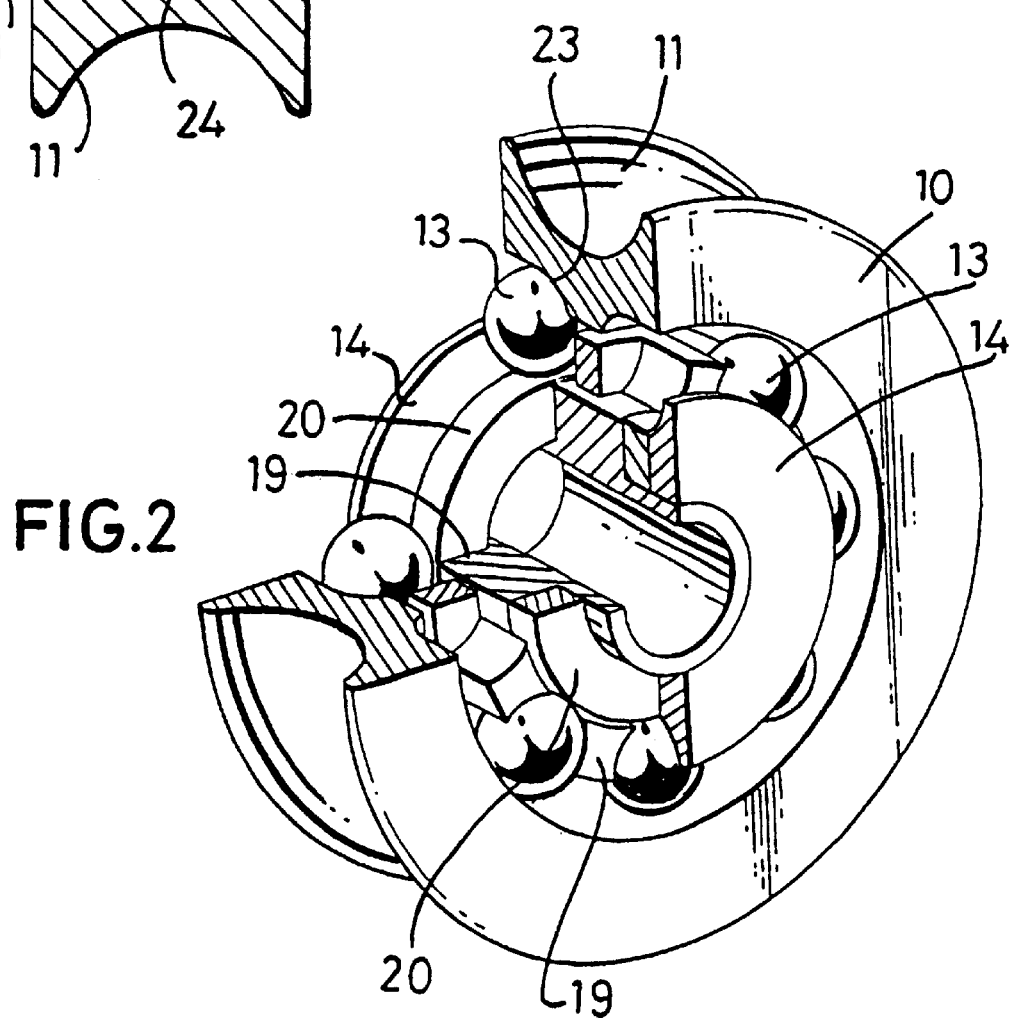
FIG. 2 is a partially cut-away isometric view of the sheave assembly shown in FIG. 1.

In other respects such as the materials from which the various components are made, the pulley block of FIGS. 3 and 4 is similar to the sheave assembly of FIGS. 1 and 2, when incorporated in a pulley block. Thus, the pulley block of FIGS. 3 and 4 is also able to demonstrate high reliability as well as high strength, but employs fewer separate components.

FIG. 5 shows an alternative sheave assembly to that of FIGS. 1 and 2, this alternative assembly having only one row of balls. The inner race comprises a first plastic moulding 40 including a side shoulder 41 and an axial boss 42 which supports an annular insert 43 and a second side shoulder component 44. As with the previous embodiments, the annular insert 43 is of metal and defines a track on which the balls 45 run, the insert 43 having a simple cylindrical outer surface extending parallel to the axis of the assembly. The two side shoulders 41 and 44 are mirror images and are profiled to allow the balls 45 to be located therebetween and to accept side thrust from those balls.

The assembly includes a sheave 46, the bore of which is profiled to receive the balls 45, so as thereby to provide axial location for the sheave. As with the previous embodiments, the sheave may be a plastics material moulding or could be machined from a metal such as an aluminium alloy.

The sheave assembly of FIG. 5 otherwise is essentially the same as that of FIGS. 1 and 2, and possesses similar advantages, as compared to conventional sheave assemblies. The assembly may be incorporated in a pulley block in much the same manner as described above, with reference to FIGS. 3 and 4.

What is claimed is:

1. A sheave assembly comprising an inner race, a sheave defining an outer race and a plurality of balls arranged between the outer race of the sheave and the inner race thereby rotatably mounting the sheave co-axially on the inner race, wherein the inner race is formed principally of a plastics material but incorporates an annular insert of a relatively hard material, the outer surface of the insert extending substantially parallel to the axis of the inner race and defining an inner track around which the balls run, and the axial width of the insert being significantly less than the diameter of each ball.

2. A sheave assembly as claimed in claim 1, wherein the annular insert is of a metal.

3. A sheave assembly as claimed in claim 2, wherein the annular insert is formed from a metal selected from the group consisting of stainless steel, brass, a bronze and an aluminum alloy.

4. A sheave assembly as claimed in claim 1, wherein the axial width of the insert is not greater than about ⅔ of the diameter of the balls.

5. A sheave assembly as claimed in claim 4, wherein the plastics material of the inner race is formed to provide shoulders retaining the balls between the inner and outer races.

6. A sheave assembly as claimed in claim 1, wherein the sheave is supported on two rows of balls, the inner race having two annular inserts spaced axially therealong and defining two inner tracks respectively for the two rows of balls.

7. A sheave assembly as claimed in claim 6, wherein the inner race has a central section and a pair of end flanges mounted one on to each end of the central section, with the two annular inserts being carried between the central section and each end flange, respectively.

8. A sheave assembly as claimed in claim 7, wherein the central section has an axially-projecting boss formed at each end, an annular insert and an end flange being mounted on each boss, respectively.

9. A sheave assembly as claimed in claim 7, wherein each end flange defines a side thrust surface for the balls.

10. A sheave assembly as claimed in claim 1, wherein the sheave comprises a one-piece plastics material moulding.

11. A sheave assembly as claimed in claim 1, wherein a cage is provided for the balls, to hold each ball spaced from its neighbouring balls.

12. A sheave assembly as claimed in claim 1, wherein each ball is made from a material selected from the group consisting of stainless steel, tungsten, a ceramic and a plastics material.

13. A pulley block comprising a sheave assembly as claimed in claim 1 and having a hole extending axially through the inner race, in combination with a pulley shell defining a pair of side cheeks and a block pin carried by the side cheeks which block pin extends through the hole of the inner race so as to support the sheave assembly between the side cheeks.

14. A pulley block as claimed in claim 13, wherein the side cheeks of the shell are profiled to accept side thrust from the balls mounting the sheave on the inner race.

15. A sheave assembly comprising an inner race, a one-piece plastics material moulded sheave defining an outer race and a plurality of balls arranged in two rows between the outer race of the sheave and the inner race thereby rotatably mounting the sheave co-axially on the inner race, wherein the inner race is formed principally of a plastics material but incorporates two axially-spaced annular inserts each of metal, the outer surfaces of the two inserts extending substantially parallel to the axis of the inner race and defining two inner tracks around which the two rows of balls respectively run, and the axial width of each insert being significantly less than the diameter of each ball.

* * * * *